(12) United States Patent
Hida et al.

(10) Patent No.: US 11,773,886 B2
(45) Date of Patent: Oct. 3, 2023

(54) ARTICLE FIXING DEVICE

(71) Applicants: HONDA MOTOR CO., LTD., Tokyo (JP); AOYAMA SEISAKUSHO CO., LTD., Aichi (JP)

(72) Inventors: Kazunori Hida, Tokyo (JP); Hideharu Kouketsu, Kani (JP); Akihiro Furukawa, Inuyama (JP); Shigeki Matsunami, Anpachi-gun (JP)

(73) Assignees: HONDA MOTOR CO., LTD., Tokyo (JP); AOYAMA SEISAKUSHO CO., LTD., Niwa-gun (JP)

(*) Notice: Subject to any disclaimer, the term of this patent is extended or adjusted under 35 U.S.C. 154(b) by 196 days.

(21) Appl. No.: 17/324,136

(22) Filed: May 19, 2021

(65) Prior Publication Data
US 2021/0372445 A1 Dec. 2, 2021

(30) Foreign Application Priority Data

Jun. 2, 2020 (JP) ................................ 2020-096222

(51) Int. Cl.
*F16B 5/02* (2006.01)
*B62D 27/06* (2006.01)
(Continued)

(52) U.S. Cl.
CPC .......... *F16B 5/0233* (2013.01); *B62D 27/065* (2013.01); *B62D 25/06* (2013.01); *F16B 5/02* (2013.01); *F16B 33/004* (2013.01)

(58) Field of Classification Search
CPC ........ F16B 5/02; F16B 5/0233; F16B 33/004; F16B 39/08; F16B 39/10; F16B 39/103;
(Continued)

(56) References Cited

U.S. PATENT DOCUMENTS 4,683,108 A * 7/1987 Balog .................. G21C 19/207
376/463
9,187,045 B2 11/2015 Bittner
(Continued)

FOREIGN PATENT DOCUMENTS

JP 2011-033164 2/2011
JP 2012-511675 5/2012

OTHER PUBLICATIONS

Japanese Office Action for Japanese Patent Application No. 2020-096222 dated Aug. 15, 2023.

*Primary Examiner* — Roberta S Delisle
(74) *Attorney, Agent, or Firm* — AMIN, TUROCY & WATSON, LLP

(57) ABSTRACT

An article fixing device includes an adjustment mechanism, a protrusion, and a fastening bolt. The adjustment mechanism is joined to a side of a lower surface of the roof panel. The protrusion is provided integrally with the adjustment mechanism and fixes a roof rail. The fastening bolt fastens a support member to the adjustment mechanism. Further, the adjustment mechanism includes a fitting convex member provided integrally with the protrusion, a fitting concave member that that is able to be screwed into the fitting convex member, and a resin ring that is provided in the fitting concave member and that cooperates with rotation of the fastening bolt.

5 Claims, 9 Drawing Sheets

(51) Int. Cl.
*F16B 33/00* (2006.01)
*B62D 25/06* (2006.01)

(58) Field of Classification Search
CPC ........ F16B 39/108; F16B 39/14; F16B 39/24;
F16B 39/34; F16B 39/36; B62D 25/06;
B62D 27/065
USPC .......................... 411/116–118, 122–123, 124
See application file for complete search history.

(56) References Cited

U.S. PATENT DOCUMENTS

| | | | |
|---|---|---|---|
| 11,346,379 B2* | 5/2022 | Hida | F16B 5/08 |
| 11,511,684 B2* | 11/2022 | Hida | B60R 9/04 |
| 2011/0243655 A1 | 10/2011 | Binder et al. | |
| 2012/0272506 A1* | 11/2012 | Figge | F16B 5/0233 |
| | | | 29/525.01 |
| 2013/0299539 A1* | 11/2013 | Bocker | B60R 9/04 |
| | | | 224/309 |
| 2017/0343034 A1* | 11/2017 | Zollmann | F16B 39/04 |
| 2021/0396253 A1* | 12/2021 | Heinrichs | B60Q 1/2642 |
| 2022/0373010 A1* | 11/2022 | Bente | F16B 43/00 |
| 2022/0381274 A1* | 12/2022 | Radanovic | F16B 5/0233 |

* cited by examiner

ARTICLE FIXING DEVICE

CROSS-REFERENCE TO RELATED APPLICATION

Priority is claimed on Japanese Patent Application No. 2020-096222, filed Jun. 2, 2020, the content of which is incorporated herein by reference.

BACKGROUND OF THE INVENTION

Field of the Invention

The present invention relates to an article fixing device.

Description of Related Art

As an article fixing device, for example, a configuration which fixes a roof rail to a roof panel of a vehicle body via an adjustment mechanism is known. Specifically, in the article fixing device, a support member attached to the vehicle body is disposed below the roof panel, and the adjustment mechanism is interposed between the support member and the roof panel. An upper end portion of the adjustment mechanism is exposed above from an opening section of the roof panel, and a fastening bolt passing through the support member and the adjustment mechanism from below protrudes above the roof panel and is screwed to the nut. The nut is attached to the roof rail.

That is, the roof rail is attached to the roof panel by fastening bolts and fixed in a state in which the adjustment mechanism is interposed between the support member and the roof panel.

According to the article fixing device, the adjustment mechanism and the nut are formed as separate members, and are disposed separately from each other. Accordingly, a load of a relatively heavy article input from the roof rail is mainly transmitted to the fastening bolts via fastening nuts (for example, see U.S. Pat. No. 9,187,045).

SUMMARY OF THE INVENTION

However, in the article fixing device disclosed in U.S. Pat. No. 9,187,045, a load input from the article such as the roof rail or the like is mainly transmitted to the fastening bolt via the nut. For this reason, it is difficult to appropriately transmit the load input from the article to the adjustment mechanism, and there is room for improvement from this point of view.

Further, there is a desire to put a technology with which the adjustment mechanism can be reliably assembled into practical use.

An aspect of the present invention is directed to providing an article fixing device capable of appropriately transmitting a load input from an article to an adjustment mechanism and reliably assembling the adjustment mechanism.

In order to solve the problems, the present invention proposes the following means.

(1) An article fixing device according to the present invention includes an adjustment mechanism interposed between a first plate and a second plate and joined to a side of a lower surface of the first plate; a protrusion provided integrally with the adjustment mechanism and configured to fix an article to an upper surface of the first plate; and a fastening bolt configured to fasten the second plate to the adjustment mechanism, and the adjustment mechanism includes a first member provided integrally with the protrusion; a second member that is able to be screwed to the first member; and a fastening bolt temporary holding member that is provided on the second member and that cooperates with rotation of the fastening bolt.

According to this configuration, the protrusion configured to fix the article is provided integrally with the adjustment mechanism. Accordingly, a load input to the first plate and protrusion from the article that is a relatively heavy article can be appropriately transmitted to the protrusion and the adjustment mechanism. Accordingly, the load input from the article can be appropriately supported by the adjustment mechanism as a whole.

In addition, the fastening bolt temporary holding member is provided on the member on the other side (i.e., second member), and the fastening bolt temporary holding member cooperates with rotation of the fastening bolt. Accordingly, for example, when the fastening bolt is rotated clockwise, the fastening bolt temporary holding member can be rotated in the same direction together with the fastening bolt. The fastening bolt temporary holding member is provided on the member on the other side ((i.e., second member). The member on the other side (i.e., second member) is screwed to the member on one side (i.e., first member).

Accordingly, when the fastening bolt temporary holding member is rotated clockwise, the member on the other side (i.e., second member) can be rotated in the same direction. When the member on the other side (i.e., second member) is rotated clockwise, the member on the other side (i.e., second member) is extended (moved) toward the second plate, and the adjustment mechanism can be reliably assembled. Accordingly, the member on the other side (i.e., second member) can abut and be fixed to the second plate, and the first plate and the second plate can be fastened and fixed to the adjustment mechanism by the fastening bolt.

(2) The fastening bolt temporary holding member may have a locking claw that locks to the fastening bolt.

According to this configuration, when the locking claw is formed on the fastening bolt temporary holding member, the fastening bolt and the fastening bolt temporary holding member can brought into contact with each other by the locking claw. Accordingly, the member on the other side (i.e., second member) can be reliably rotated clockwise together with the fastening bolt temporary holding member in cooperation with rotation of the fastening bolt. Accordingly, the member on the other side (i.e., second member) can be reliably extended (moved) toward the second plate, and the member on the other side (i.e., second member) can abut and be reliably fixed to the second plate.

(3) The fastening bolt temporary holding member may have a tool locking groove to which a tool is able to be locked.

Here, it is conceivable that, when the fastening bolt temporary holding member is, for example, a resin ring formed of a resin, the locking claw of the fastening bolt temporary holding member may be crushed once the fastening bolt is fastened. When the locking claw is crushed, even if the article fixing device is attached to the vehicle body again through maintenance or the like, it is difficult to rotate the fastening bolt temporary holding member clockwise in cooperation with the fastening bolt.

Here, the tool locking groove is formed in the fastening bolt temporary holding member. Accordingly, when the tool is locked to the locking groove and rotated clockwise, the fastening bolt temporary holding member can be rotated in the same direction. That is, the member on the other side (i.e., second member) can be rotated clockwise by the fastening bolt temporary holding member. Accordingly, the adjustment mechanism can be reliably assembled by being extended (moved) toward the second plate, for example, after maintenance. Accordingly, the member on the other side (i.e., second member) can abut and be fixed to the second plate, and after maintenance, the first plate and the second plate can be fastened and fixed to the adjustment mechanism by the fastening bolt.

(4) The fastening bolt temporary holding member may be formed in a polygonal shape when seen in a plan view so as to be fitted into a concave section of the member on the other side (i.e., second member).

According to this configuration, since the fastening bolt temporary holding member can be fitted into the concave section of the member on the other side (i.e., second member), a dimension of the adjustment mechanism in an axial direction can be reduced, and the adjustment mechanism can be reduced in size.

(5) The fastening bolt temporary holding member may have the tool locking groove formed in a convex section protruding toward the second plate farther than the locking claw.

According to this configuration, in the fastening bolt temporary holding member, the convex section protrudes toward the second plate farther than the locking claw, and the tool locking groove is formed in the convex section. Accordingly, the tool locking groove can approach the second plate, and the tool can easily access (engage with) the tool locking groove.

(6) The tool locking groove may be formed in a cross shape.

According to this configuration, the tool configured to rotate the fastening bolt temporary holding member, for example, a cross-shaped tool such as a Philipps head screwdriver, can be easily engaged with the tool locking groove. In addition, when the cross-shaped tool is engaged with the tool locking groove, an engaged place (a contact place) with the fastening bolt temporary holding member can be increased compared to a slot head screwdriver.

Accordingly, when the fastening bolt temporary holding member is rotated by the tool, the load applied to the tool locking groove can be appropriately distributed. Accordingly, for example, even when the fastening bolt temporary holding member is a resin ring formed of a resin, the tool locking groove cannot be easily crushed. Accordingly, strength of the tool locking groove (i.e., the fastening bolt temporary holding member) can be minimized.

According to the aspect of the present invention, the load input from the article can be appropriately transmitted to the adjustment mechanism, and the adjustment mechanism can be reliably assembled.

DETAILED DESCRIPTION OF THE INVENTION

Figure 1:
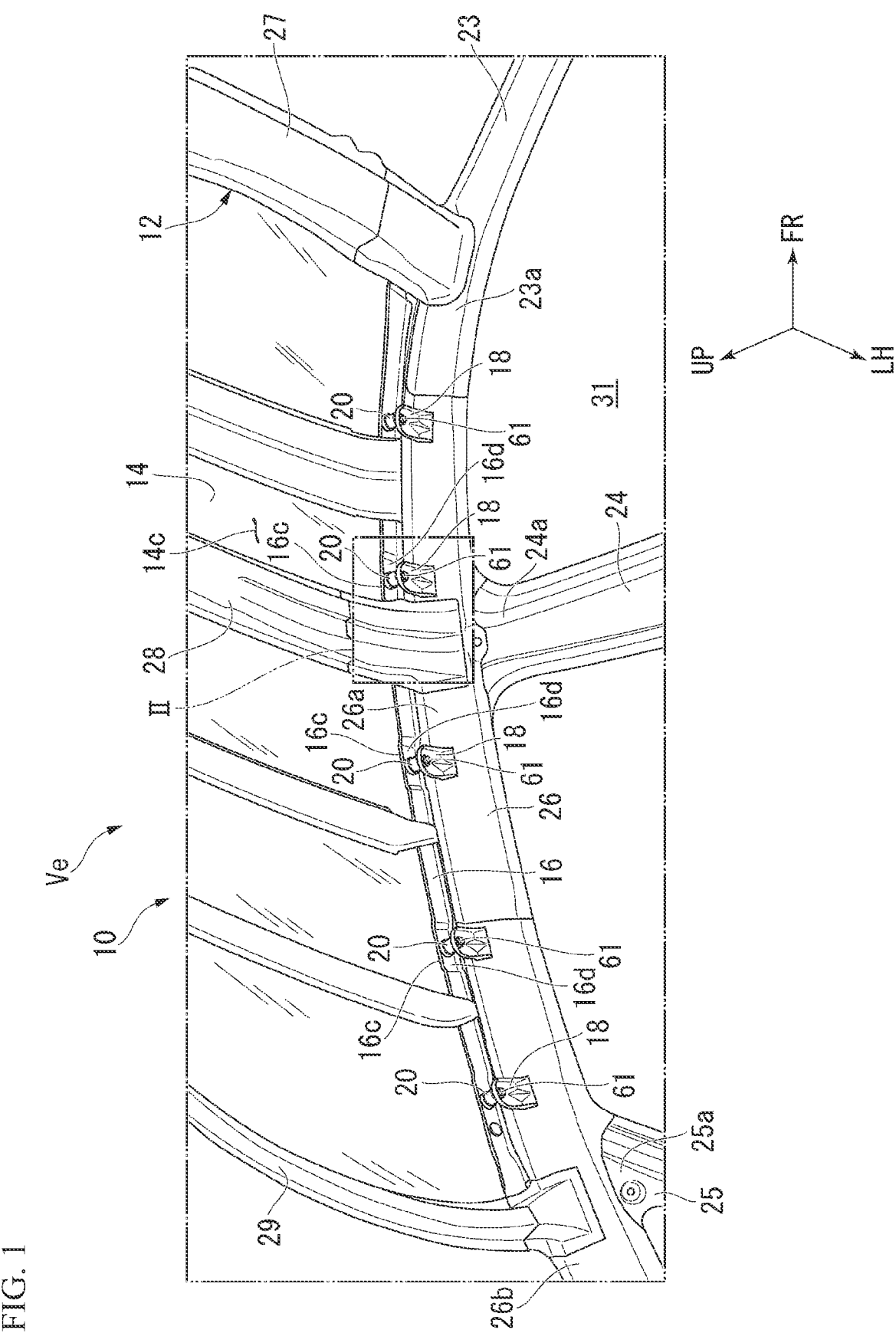
FIG. 1 is a perspective view of a vehicle body upper structure including an article fixing device according to an embodiment of the present invention from the side of a passenger compartment.

Hereinafter, an article fixing device of an embodiment of the present invention will be described with reference to the accompanying drawings. In the drawings, an arrow FR indicates a forward direction of a vehicle, an arrow UP indicates an upward direction of the vehicle, and an arrow LH indicates a leftward direction of the vehicle. In the embodiment, while a left side of a vehicle body Ve will be exemplarily described as a vehicle body upper structure 10 including an article fixing device 20, the right side of the vehicle body Ve has the same configuration.

Figure 2:
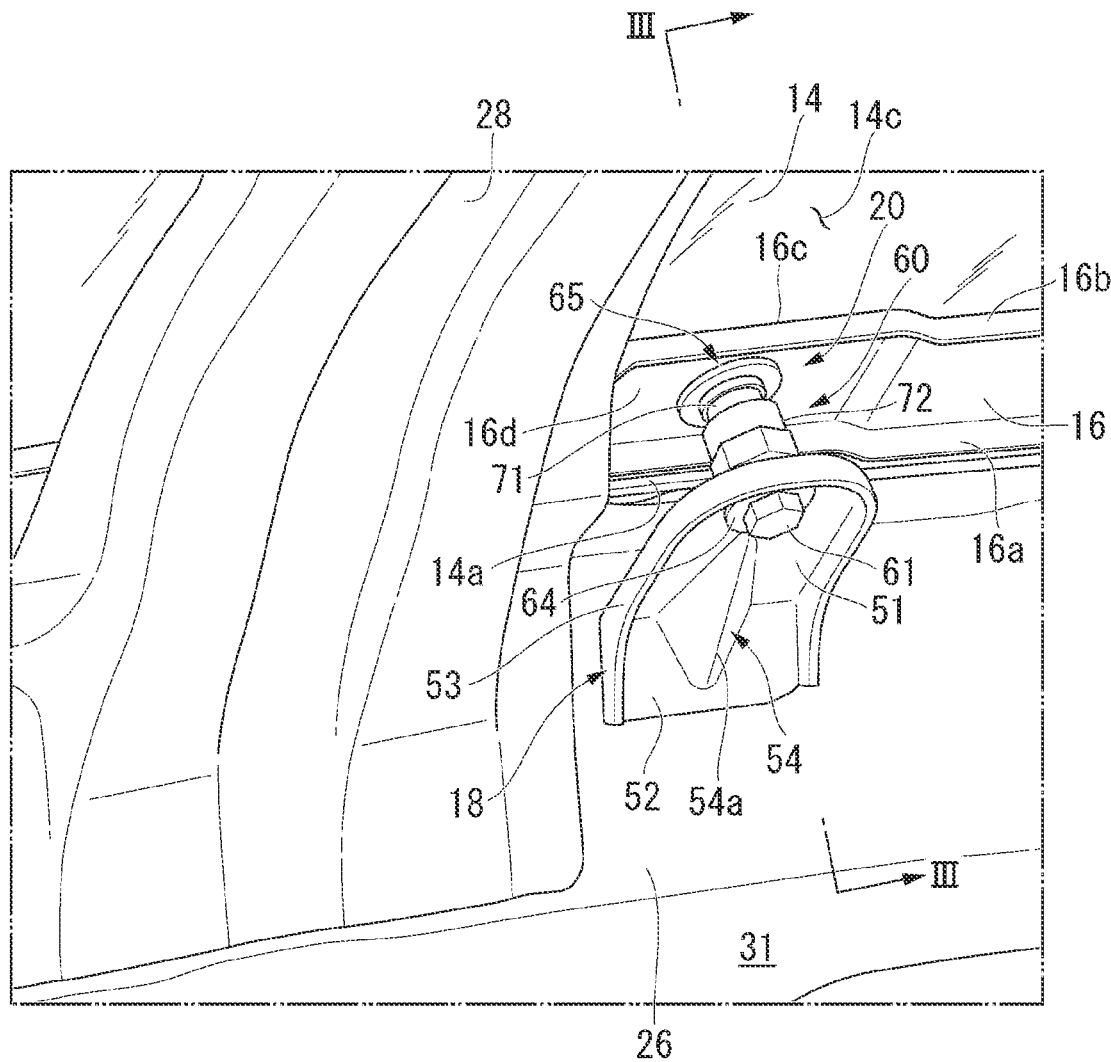
FIG. 2 is an enlarged perspective view of a portion II in FIG. 1.
Figure 3:
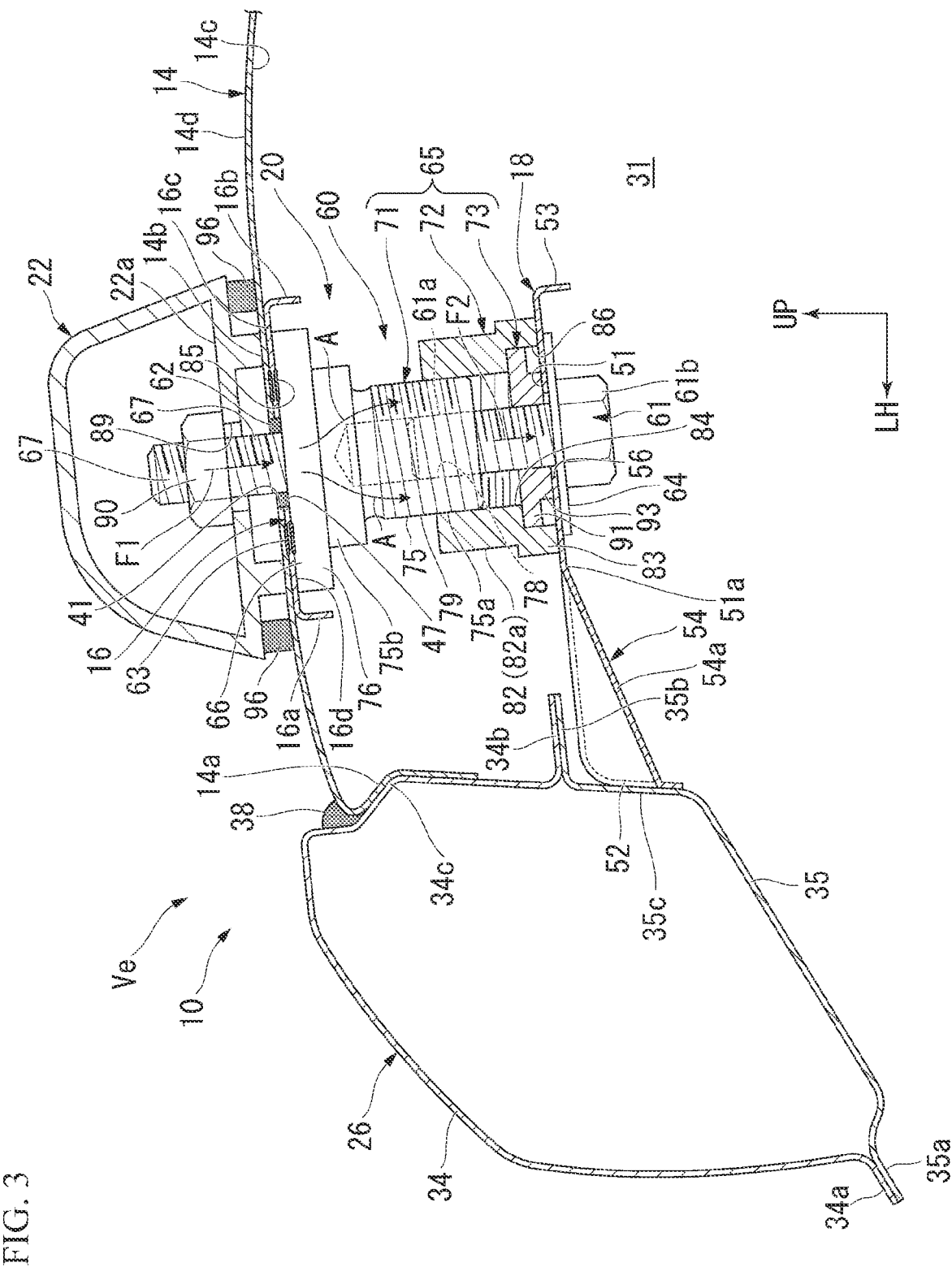
FIG. 3 is a cross-sectional view along line in FIG. 2.

As shown in FIG. 1 and FIG. 2, the vehicle body upper structure 10 includes a vehicle body skeleton member 12, a roof panel (a first plate) 14, a reinforcement member 16, a plurality of support members (second plates) 18, the plurality of article fixing devices 20, and a roof rail (an article) 22 (see FIG. 3).

The vehicle body skeleton member 12 includes a front pillar 23, a center pillar 24, a quarter pillar 25, a roof side rail 26, a front roof cross member 27, a center roof cross member 28, and a quarter roof cross member 29.

The front pillar 23 stands up on a front left side portion of a passenger compartment 31 and is formed in a closed cross section. The front roof cross member 27 bridges an upper end portion 23*a* of the left front pillar 23 and an upper end portion (not shown) of the right front pillar in a vehicle width direction.

The center pillar 24 stands up on a center left side portion of the passenger compartment 31 and is formed in a closed cross section. The quarter pillar 25 stands up on a rear left side portion of the passenger compartment 31 and is formed in a closed cross section.

The roof side rail 26 is connected to the upper end portion 23*a* of the front pillar 23, an upper end portion 24*a* of the center pillar 24, and an upper end portion 25*a* of the quarter pillar 25.

As shown in FIG. 3, the roof side rail 26 includes, for example, an outer side rail 34 and an inner side rail 35. The outer side rail 34 has a first outer flange 34*a* forming an upper section of the roof side rail 26 and overhanging outward in the vehicle width direction, and a first inner flange 34*b* overhanging inward in the vehicle width direction. The inner side rail 35 has a second outer flange 35*a* forming a lower section of the roof side rail 26 and overhanging outward in the vehicle width direction, and a second inner flange 35b overhanging inward in the vehicle width direction.

The first outer flange 34a and the second outer flange 35a are joined to each other, and the first inner flange 34b and the second inner flange 35b are joined to each other. Accordingly, the roof side rail 26 is formed in a closed cross section by the outer side rail 34 and the inner side rail 35.

Returning to FIG. 1, the center roof cross member 28 bridges, in the vehicle width direction, an area 26a near a center of the left roof side rail 26 in a vehicle body forward/rearward direction and an area (not shown) near a center of the right roof side rail in the vehicle body forward/rearward direction. The quarter roof cross member 29 bridges a vehicle body rear section 26b of the left roof side rail 26 and a vehicle body rear section (not shown) of the right roof side rail in the vehicle width direction.

The roof panel 14 is supported by the roof side rail 26, the front roof cross member 27, the center roof cross member 28, and the quarter roof cross member 29.

The roof panel 14 has an outer circumferential section formed along the left roof side rail 26, the right roof side rail, the front roof cross member 27, and the quarter roof cross member 29 in a rectangular shape when seen in a plan view.

As shown in FIG. 3, the roof panel 14 has a left side portion (an outer side portion) 14a formed along an inner side portion 34c of the outer side rail 34, and the left side portion 14a and the inner side portion 34c are joined at a brazing joining section 38 through brazing (soldering). The roof panel 14 has a rail attachment area 14b disposed near the left side portion 14a and formed along the left side portion 14a, and a plurality of first through-holes 41 (see also FIG. 4) formed in the rail attachment area 14b at intervals in the vehicle body forward/rearward direction.

As shown in FIG. 1 and FIG. 3, in a lower surface 14c of the roof panel 14, the reinforcement member 16 extends along the left side portion 14a in a belt shape in the vehicle body forward/rearward direction. In the reinforcement member 16, an outer side 16a is bent downward, an inner side 16b is bent downward, and a plurality of raised sections 16c are formed at intervals in the vehicle body forward/rearward direction. The plurality of raised sections 16c are joined to the lower surface 14c of the roof panel 14.

Figure 4:
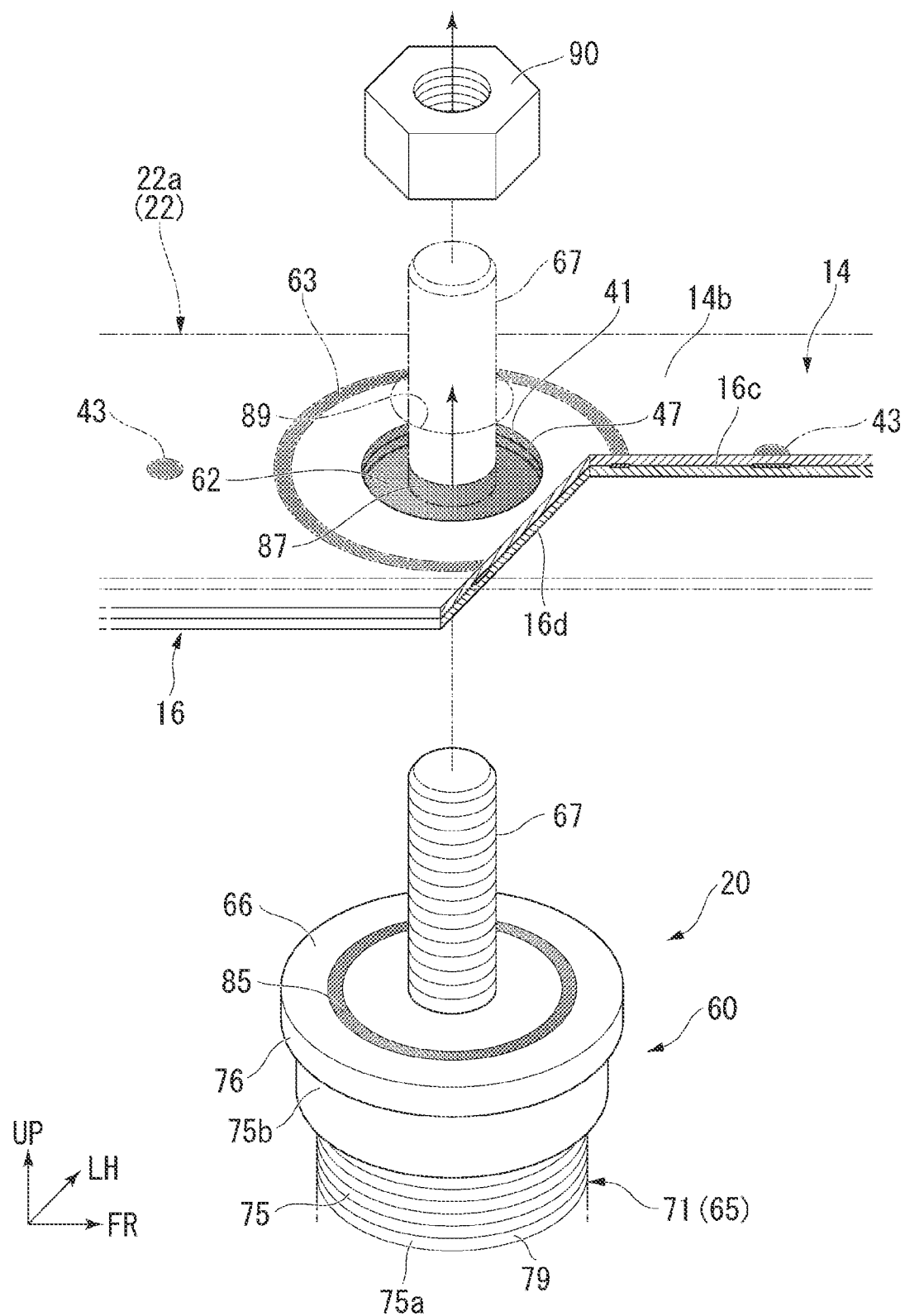
FIG. 4 is an exploded perspective view showing the article fixing device of the embodiment.

As shown in FIG. 3 and FIG. 4, the raised sections 16c of the reinforcement member 16 are disposed around the first through-holes 41 in the lower surface 14c of the roof panel 14, and are joined to an area 43 covered with the roof rail 22 from above the vehicle body, for example, through spot welding or by an adhesive agent.

In this way, the reinforcement member 16 is joined to the area 43 in the lower surface 14c of the roof panel 14 covered with the roof rail 22 from above the vehicle body. Accordingly, the area 43 in which the reinforcement member 16 is joined to the roof panel 14 (for example, a welding dent when joined through spot welding or the like) can be covered with the roof rail 22 from above the vehicle body, and an appearance characteristic (good appearance) can be secured.

In addition, a second seal member 63 is provided between the raised sections 16c of the reinforcement member 16 and the lower surface 14c of the roof panel 14 throughout the entire circumference of the first through-holes 41. The second seal member 63 will be described below in detail.

The raised section 16c has a second through-hole 47. The second through-hole 47 is disposed below the first through-hole 41 of the roof panel 14.

A plurality of support members 18 (see also FIG. 1) are disposed below the plurality of raised sections 16c at intervals. The plurality of support members 18 are joined to an inner side portion (an attachment section on the side of the vehicle body Ve) 35c of the inner side rail 35. Hereinafter, the attachment section 35c on the side of the vehicle body Ve is referred to as "the attachment section 35c on the side of the vehicle body." The article fixing device 20 is interposed between the reinforcement member 16 and the support members 18.

As shown in FIG. 2 and FIG. 3, the support members 18 have a support attachment section 51, a base end portion 52, a peripheral section 53, and a diagonal brace (a gusset) 54. In the support members 18, for example, the support attachment section 51, the base end portion 52, the peripheral section 53 and the diagonal brace 54 are integrally formed of one plate member.

The support attachment section 51 is disposed below the raised sections 16c of the reinforcement member 16, and formed along the raised sections 16c in a flat shape. The support attachment section 51 has, for example, a tip formed in a curved shape protruding inward in the vehicle width direction and a base end formed in a linear shape extending in the vehicle body forward/rearward direction. The base end portion 52 is formed on the base end of the support attachment section 51. The support attachment section 51 has an attachment hole 56 in an area near the tip.

The base end portion 52 is bent downward from the base end of the support attachment section 51 along the attachment section 35c on the side of the vehicle body. When the base end portion 52 is joined to the attachment section 35c on the side of the vehicle body, the support members 18 are cantilever-supported by the attachment section 35c on the side of the vehicle body. The peripheral section 53 is formed around the support attachment section 51 and the base end portion 52. The peripheral section 53 is bent downward from a periphery of the support attachment section 51, and bent inward from the periphery of the base end portion 52 in the vehicle width direction. The support attachment section 51 is reinforced by the peripheral section 53.

The diagonal brace 54 is formed on the support attachment section 51 and the base end portion 52. The diagonal brace 54 is provided on the base end portion 52 and the support attachment section 51. The diagonal brace 54 has a lower side 54a that extends at an upward gradient inward in the vehicle width direction from the base end portion 52 to an area 51a of the support attachment section 51 near the attachment hole 56. In this way, in a state in which the support members 18 are cantilever-supported by the attachment section 35c on the side of the vehicle body, when the diagonal brace 54 is provided on the support members 18, the support members 18 are reinforced by the diagonal brace 54, and strength and rigidity of the support members 18 are secured.

Figure 5:
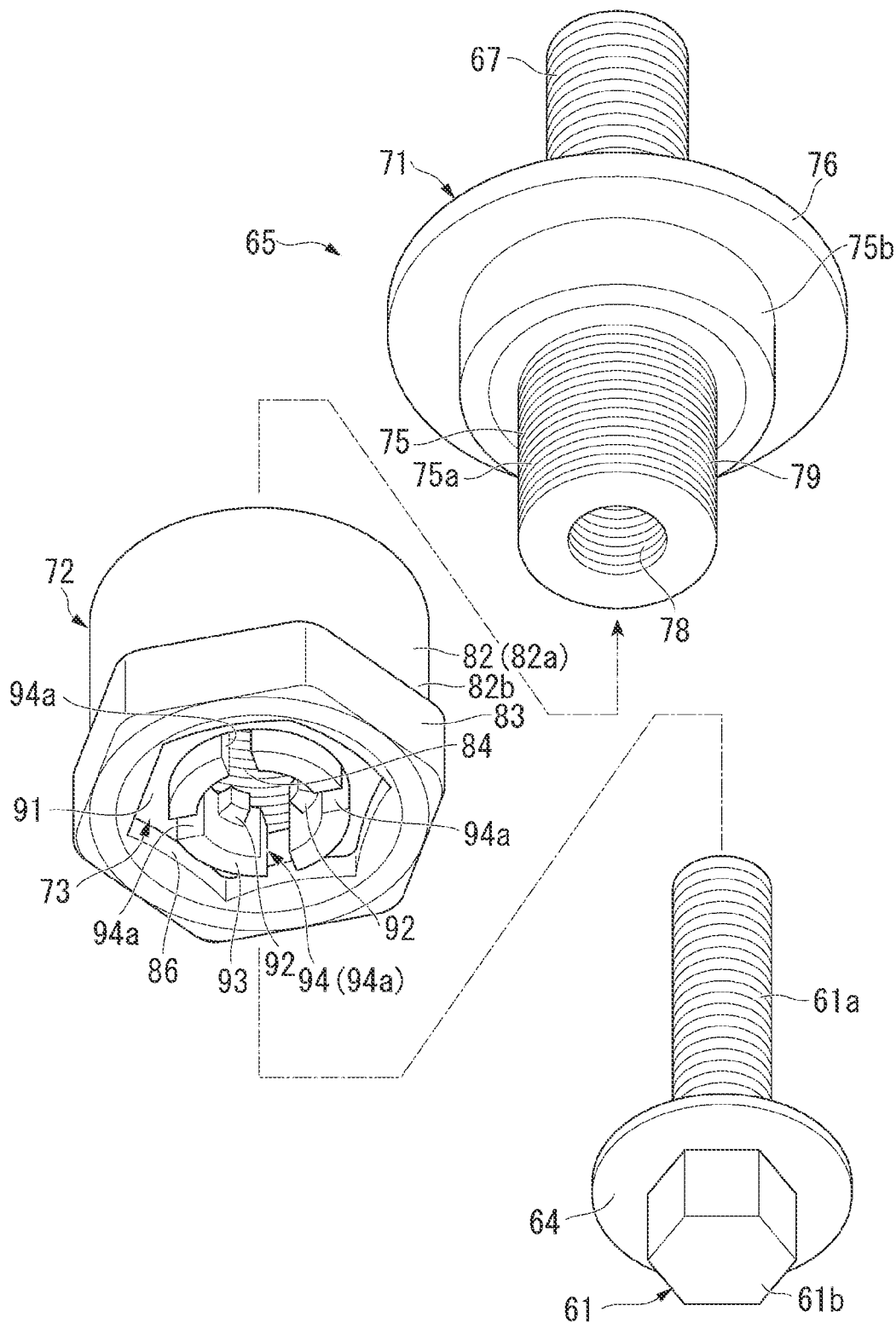
FIG. 5 is an exploded perspective view showing the adjustment mechanism of the embodiment.

As shown in FIG. 3 to FIG. 5, the support attachment section 51 of the support members 18 is disposed below the raised sections 16c of the reinforcement member 16 with an interval. The article fixing device 20 is interposed between the raised sections 16c and the support attachment section 51.

The article fixing device 20 includes a roof rail attachment member 60, a fastening bolt 61, a first seal member 62, and the second seal member 63. The roof rail attachment member 60 includes an adjustment mechanism 65, a head seating surface 66, and a protrusion 67.

The adjustment mechanism 65 is joined to the lower surface 14c of the roof panel 14 via the reinforcement member 16. The adjustment mechanism 65 includes a fitting convex member (a member on one side, a first member) 71, a fitting concave member (a member on the other side, a second member) 72, and a resin ring (a fastening bolt temporary holding member) 73.

The fitting convex member 71 has a first cylindrical section 75 and an overhanging apex section 76. The first cylindrical section 75 is formed in a hollow cylindrical shape by a cylinder wall 75a, and a female screw 78 is formed in an inner circumferential surface of the cylinder wall 75a. In addition, a male screw 79 is formed in the outer circumferential surface of the cylinder wall 75a. Further, the overhanging apex section 76 is provided integrally with an apex section 75b of the first cylindrical section 75. The apex section 75b (the female screw 78) of the first cylindrical section 75 is closed by the overhanging apex section 76.

The overhanging apex section 76 is formed in a disk shape, and overhangs outward from the cylinder wall 75a of the first cylindrical section 75 in a radial direction. The overhanging apex section 76 has the head seating surface 66 formed on the upper surface in a circular shape. The protrusion 67 protrudes from a center of the head seating surface 66 toward a side opposite to the first cylindrical section 75. The protrusion 67 is constituted by a male screw section. The head seating surface 66 and the protrusion 67 will be described below in detail.

The fastening bolt 61 is screwed into the female screw 78 of the first cylindrical section 75 of the fitting convex member 71. In addition, the fitting concave member 72 is screwed into the male screw 79 of the first cylindrical section 75.

The fitting concave member 72 has a second cylindrical section 82 and an overhanging bottom section 83. The second cylindrical section 82 has a female screw 84 formed in a hollow cylindrical shape by a cylinder wall 82a and formed in the inner circumferential surface of the cylinder wall 82a, and a fitting section (a concave section) 86 formed in a bottom section 82b. The female screw 84 is formed to be screwed into the male screw 79 of the first cylindrical section 75. When the female screw 84 of the second cylindrical section 82 is screwed into the male screw 79 of the first cylindrical section 75, the second cylindrical section 82 is fitted to the first cylindrical section 75 so that it can protrude and retract freely. Accordingly, a dimension of the adjustment mechanism 65 in the axial direction can be adjusted.

The fitting section 86 has an inner circumferential surface of the bottom section 82b formed in a polygonal shape (for example, in the embodiment, a hexagonal shape), and opens to a bottom surface of the bottom section 82b. The resin ring 73 is provided on the fitting section 86. While the example in which the fitting section 86 is formed in a hexagonal shape has been described in the embodiment, the fitting section 86 may be formed in a triangular shape, a quadrangular shape, or a pentagonal shape.

The overhanging bottom section 83 is provided integrally with the bottom section 82b of the second cylindrical section 82. The overhanging bottom section 83 has an external form with a polygonal shape (for example, in the embodiment, a hexagonal shape), and overhangs outward from the cylinder wall 82a of the second cylindrical section 82 in the radial direction. While the example in which the external form of the overhanging bottom section 83 is a hexagonal shape has been described in the embodiment, the external form of the overhanging bottom section 83 may be a triangular shape, a quadrangular shape or a pentagonal shape.

Figure 6:
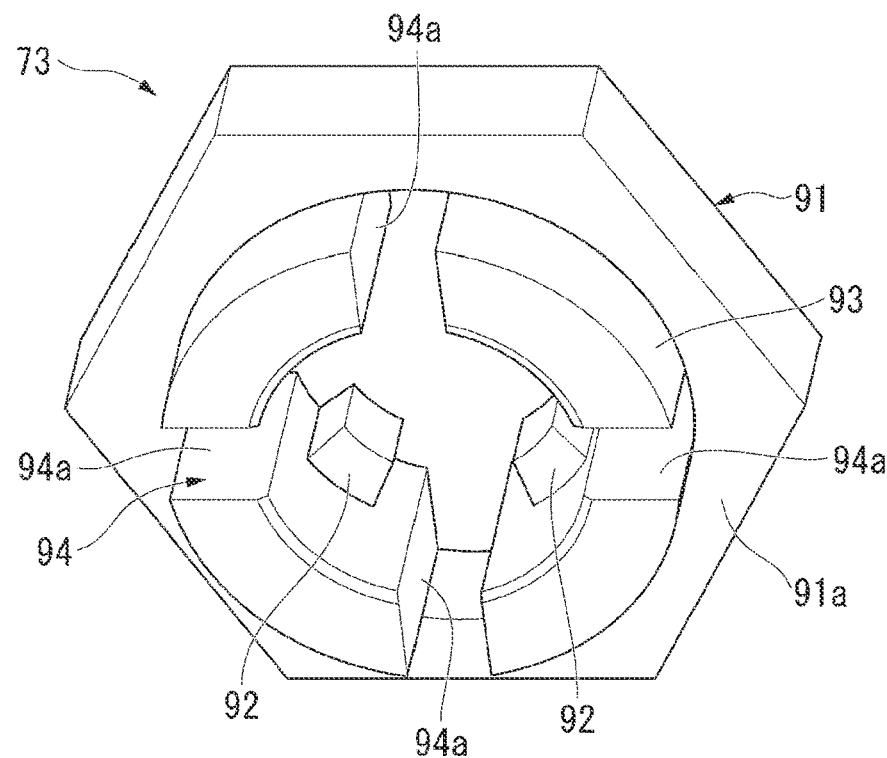
FIG. 6 is a perspective view showing a resin ring of the embodiment.
Figure 7:
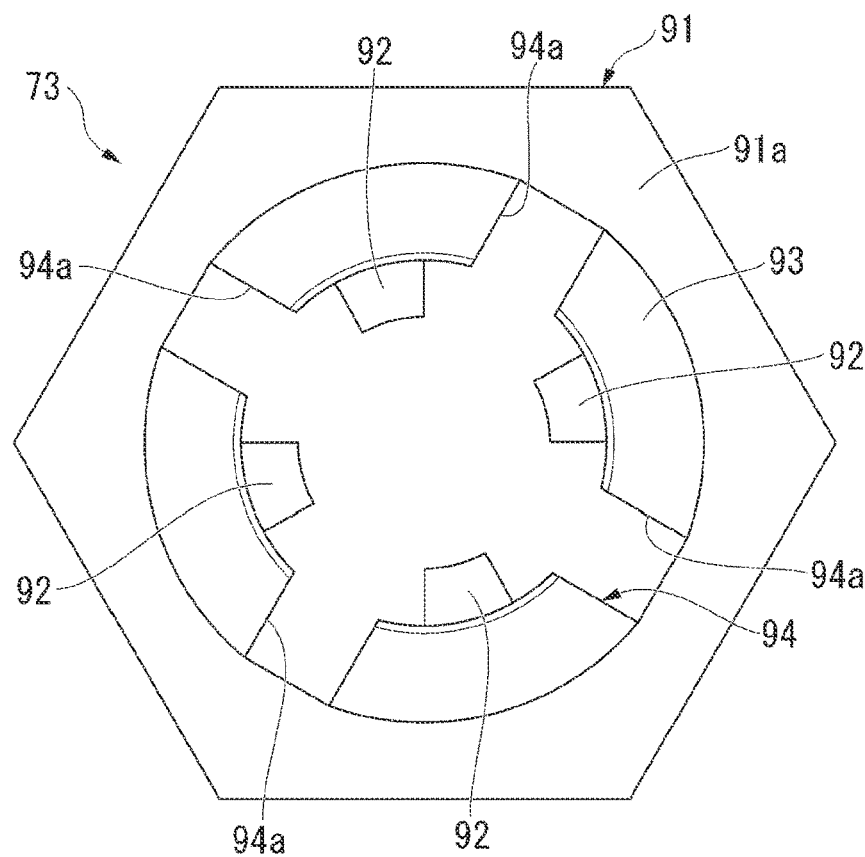
FIG. 7 is a plan view showing the resin ring in FIG. 6.

As shown in FIG. 5 to FIG. 7, the resin ring 73 is formed of a resin, and has a ring section 91, a plurality of locking claws 92, a convex section 93, and a tool locking groove 94. The ring section 91 is formed in an annular shape and can be fitted onto the fitting section 86 from an opening of the bottom section 82b, and an external form is a polygonal shape (for example, in the embodiment, a hexagonal shape) when seen in a plan view. Specifically, the ring section 91 is formed in the same polygonal shape as the fitting section 86 so that it can be fitted into the fitting section 86. While the case in which the external form of the ring section 91 is a hexagonal shape has been described in the embodiment, the external form of the ring section 91 may be a triangular shape, a quadrangular shape or a pentagonal shape.

When the external form of the ring section 91 is a polygonal shape and the fitting section 86 is formed in a polygonal shape, the resin ring 73 is rotated, for example, clockwise, and the fitting section 86 (i.e., the fitting concave member 72) is rotated clockwise in cooperation with the resin ring 73.

The plurality of (for example, in the embodiment, four) locking claws 92 protrude inward from the inner circumferential surface of the ring section 91 in the radial direction. The plurality of locking claws 92 are formed at equal intervals in the circumferential direction of the inner circumferential surface. The plurality of locking claws 92 are formed to be locked to the screw section 61a of the fastening bolt 61. While the example in which the plurality of locking claws 92 are four has been described in the embodiment, for example, the plurality of locking claws 92 may be three, five, or more.

The convex section 93 is formed on a surface 91a of the ring section 91 on the side of the opening of the bottom section 82b. The convex section 93 protrudes from the surface 91a of the ring section 91 toward the opening of the bottom section 82b in an annular shape. That is, the convex section 93 protrudes toward the support members 18 (see FIG. 3) further than the plurality of locking claws 92.

The tool locking groove 94 is formed in the annular ring section 91 and the annular convex section 93. When the tool locking groove 94 is formed in, for example, a cross shape, a plurality of (i.e., four) groove sections 94a are formed in the annular ring section 91 and the annular convex section 93. The plurality of groove sections 94a are formed at equal intervals in the ring section 91 and the convex section 93 in a circumferential direction in a concave shape outward in the radial direction. The tool locking grooves 94 are formed such that a tool 100 (see FIG. 9A) can be locked to the plurality of groove sections 94a.

The resin ring 73 formed in this way is fitted into the fitting section 86 of the fitting concave member 72. Accordingly, a dimension of the adjustment mechanism 65 in the axial direction can be reduced, and the adjustment mechanism 65 can be reduced in size.

As shown in FIG. 3 and FIG. 5, in the adjustment mechanism 65, the overhanging bottom section 83 is placed on the support attachment section 51 of the support member 18. In this state, the plurality of locking claws 92 of the resin ring 73, the female screw 84 of second cylindrical section 82, and the female screw 78 of the first cylindrical section 75 are disposed above the attachment hole 56 of the support attachment section 51. The fastening bolt 61 passes through the attachment hole 56 from below, and the fastening bolt 61 passing therethrough is screwed into the female screw 78 via the plurality of locking claws 92 and the female screw 84.

In addition, a washer 64 is interposed between a head section 61b of the fastening bolt 61 and the support attachment section 51.

In this state, the screw section 61a of the fastening bolt 61 is locked to the plurality of locking claws 92. Accordingly, when the fastening bolt 61 is rotated clockwise, the plurality of locking claws 92 (i.e., the resin ring 73) are rotated clockwise in cooperation with the fastening bolt 61. When the resin ring 73 is rotated clockwise, the fitting section 86 (i.e., the fitting concave member 72) is rotated clockwise in cooperation with the resin ring 73.

Accordingly, the head section 61b of the fastening bolt 61 moves toward the fitting convex member 71, and the fitting concave member 72 moves away from the fitting convex member 71 (i.e., toward the support attachment section 51). Accordingly, the fitting concave member 72 is fixed to the support attachment section 51. In other words, the support attachment section 51 is fastened to the fitting concave member 72 by the fastening bolt 61. That is, the adjustment mechanism 65 is fixed to the attachment section 35c on the side of the vehicle body via the support members 18.

Here, the attachment hole 56 of the support member 18 is formed in a shape such that position adjustment in a direction crossing the axial direction of the fastening bolt 61 is allowed in a state in which the fastening bolt 61 passes therethrough. Specifically, the attachment hole 56 is formed such that, for example, an inner diameter dimension is larger than an outer diameter dimension of the fastening bolt 61 such that position adjustment is allowable (a so-called loose hole). As another example, the attachment hole 56 is formed as an elongated hole, and position adjustment in a direction crossing the axial direction of the fastening bolt 61 can also be allowable.

As shown in FIG. 3 and FIG. 4, the head seating surface 66 and the protrusion 67 are provided integrally with the overhanging apex section 76 of the adjustment mechanism 65. The head seating surface 66 is formed in an upper surface of the overhanging apex section 76 in, for example, a circular shape. The head seating surface 66 is joined to a lower surface 16d of the reinforcement member 16 (specifically, the raised sections 16c) at an annular joining section 85 throughout the entire circumference of the first through-holes 41, for example, through ring projection welding, by an adhesive agent, or the like. Accordingly, a space between the head seating surface 66 and the lower surface 16d of the raised sections 16c is closed by the joining section 85 throughout the entire circumference outside a gap 87 between the first through-holes 41 and the protrusion 67 in the radial direction.

The protrusion 67 protrudes from the head seating surface 66 of the protrusion 67 on the same axis as the fitting convex member 71. The protrusion 67 is constituted by a male screw section, and passes through the second through-hole 47 of the reinforcement member 16 and the first through-holes 41 of the roof panel 14 from the inner side of the reinforcement member 16 in the vehicle toward the outer side of the roof panel 14 in the vehicle. The roof rail 22 is attached to the protrusion 67 protruding upward from the roof panel 14.

Specifically, a base attachment hole 89 is formed in a base 22a of the roof rail 22, and the protrusion 67 passing through the base attachment hole 89 protrudes above the base 22a. When a nut 90 is screwed onto the protrusion 67 protruding above the base 22a, the roof rail 22 is attached to the protrusion 67 and fixed to an upper surface 14d of the roof panel 14. In this state, a seal member 96 is interposed between the inner side portion of the roof rail 22 and the upper surface 14d of the roof panel 14. In addition, the seal member 96 is interposed between the outer side portion of the roof rail 22 and the upper surface 14d of the roof panel 14.

In addition, the protrusion 67 of the roof rail attachment member 60 protrudes to the outer side of the roof panel 14. Accordingly, when the roof rail 22 is attached to the roof panel 14, the protrusion 67 can function as a positioning standard of the roof rail 22 by the base attachment hole 89 of the roof rail 22 being fitted onto the protrusion 67. Accordingly, attachment workability when the roof rail 22 is attached to the upper surface 14d of the roof panel 14 can be increased.

Here, it is conceivable that, when the vehicle body Ve is assembled, for example, a position of the attachment section 35c on the side of the vehicle body is shifted by an assembly tolerance or the like. In addition, it is conceivable that, when the roof panel 14 is attached to the roof side rail 26 through brazing, a position of the roof panel 14 is shifted. For this reason, it is conceivable that a relative position between the support members 18 and the roof panel 14 is displaced. Here, the adjustment mechanism 65 is interposed between the support members 18 and the roof panel 14 (specifically, the reinforcement member 16). Accordingly, a positional shift between the support members 18 and the roof panel 14 can be absorbed by the adjustment mechanism 65 by adjusting the adjustment mechanism 65 to correspond to a positional shift between the support members 18 and the roof panel 14.

Specifically, the fitting convex member 71 of the adjustment mechanism 65 is joined to the roof panel 14 via the reinforcement member 16, and the fitting concave member 72 of the adjustment mechanism 65 is fixed to the attachment section 35c on the side of the vehicle body via the support members 18. Accordingly, a positional shift of the roof panel 14 in the upward/downward direction when the roof panel 14 is brazed to the roof side rail 26 or a positional shift of the support member in the upward/downward direction when the support members 18 are fixed to the attachment section 35c on the side of the vehicle body can be absorbed by adjustment in a screwed state of the adjustment mechanism 65.

In addition, it is conceivable that the support members 18 and the roof panel 14 are shifted in a direction crossing the axis direction of the fastening bolt 61 in a state in which the roof panel 14 is attached to the roof side rail 26 and the support members 18 are attached to the attachment section 35c on the side of the vehicle body.

Here, the attachment hole 56 of the support member 18 is formed such that position adjustment of the fastening bolt 61 in a direction crossing the axis direction is allowed. Accordingly, a shift between the support members 18 and the roof panel 14 can be absorbed by the attachment hole 56 by adjusting a position of the fastening bolt 61 according to a relative shift between the support members 18 and the roof panel 14.

Further, the protrusion 67 is provided integrally with the adjustment mechanism 65, and the roof rail 22 is fixed to the roof panel 14 by the protrusion 67. Accordingly, a load F1 input from the roof rail 22 that is a relatively heavy substance can be appropriately transmitted to the adjustment mechanism 65 via the protrusion 67 like an arrow A. Accordingly, the load F1 input from the roof rail 22 can be appropriately supported by the adjustment mechanism 65 as a whole.

In addition, the protrusion 67 is provided integrally with the fitting convex member 71 of the adjustment mechanism 65, and the fitting convex member 71 is screwed into the fitting concave member 72 of the adjustment mechanism 65. Accordingly, the protrusion 67, the fitting convex member 71 and the fitting concave member 72 can be integrated. Accordingly, the load F1 input from the roof rail 22 can be appropriately transmitted to the adjustment mechanism 65 via the protrusion 67.

Further, the reinforcement member 16 is joined to the lower surface 14c of the roof panel 14 around the first through-holes 41. Accordingly, the roof panel 14 around the first through-holes 41 to which a relatively large load F1 is input from the protrusion 67 or the roof rail 22 can be reinforced by the reinforcement member 16. Accordingly, a plate thickness dimension of the roof panel 14 as a whole can be reduced, and reduction in weight of the roof panel 14 (i.e., the vehicle body) can be achieved.

In addition, when the diagonal brace 54 is provided on the support members 18, the support members 18 are reinforced by the diagonal brace 54. Accordingly, when the load F1 input from the roof rail 22 is transmitted to the support members 18 via the adjustment mechanism 65, the transmitted load F2 can be appropriately supported by the support members 18. Accordingly, the load F2 transmitted to the support members 18 can be appropriately transmitted to the vehicle body Ve via the support members 18 and the attachment section 35c on the side of the vehicle body.

Here, the first seal member 62 is provided in the gap 87 between the first through-holes 41 and the protrusion 67. As the first seal member 62, for example, a seal member, a grommet, or the like, applied in a liquid state in use and then cured at a room temperature is exemplified. When the first seal member 62 is provided in the gap 87 between the first through-holes 41 and the protrusion 67, intrusion of water into the vehicle from the roof panel 14 from the gap 87 is suppressed. Accordingly, it is possible to obtain a sealing effect such that intrusion of water into the vehicle from the roof panel 14 can be suppressed by a simple configuration.

In addition, the head seating surface 66 is joined to the lower surface 16d of the reinforcement member 16 (specifically, the raised sections 16c) at the annular joining section 85, for example, through ring projection welding or by an adhesive agent. The joining section 85 is formed in an annular shape throughout the entire circumference of the first through-holes 41 and the second through-hole 47 outside in the radial direction. Accordingly, an annular sealing effect can be obtained throughout the entire outer circumference of the gap 87 between the first through-holes 41 and the protrusion 67 by the simple configuration in which the head seating surface 66 is joined to the lower surface 16d of the raised section 16c. Accordingly, a reliable sealing effect can be further increased by a simple seal configuration.

Further, the second seal member 63 is formed in an annular shape throughout the entire circumference of the first through-hole 41 and the second through-hole 47 between the raised sections 16c and the lower surface 14c of the roof panel 14. As the second seal member 63, for example, a seal member or the like applied in a liquid state in use and cured at a room temperature after the application is exemplified.

In this way, when the second seal member 63 is provided in an annular shape throughout the entire circumference of the first through-hole 41 and the second through-hole 47, the space between the raised sections 16c and the lower surface 14c of the roof panel 14 can be closed by the second seal member 63 throughout the entire circumference of the first through-holes 41. Accordingly, a sealing effect with respect to the gap 87 between the first through-holes 41 and the protrusion 67 can be obtained, and a reliable sealing effect can be further increased by a simple seal configuration.

Next, an example in which the adjustment mechanism 65 according to the embodiment is assembled will be described with reference to FIG. 8A and FIG. 8B.

Figure 8A:
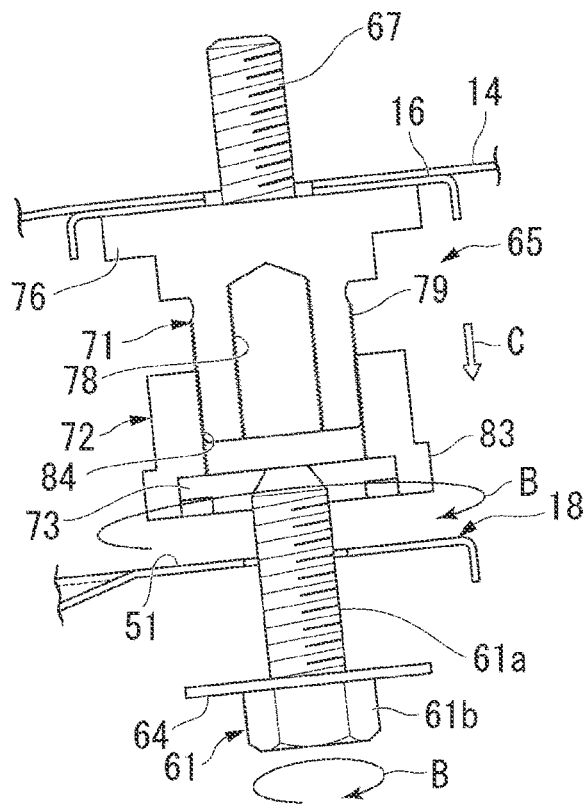
FIG. 8A is a cross-sectional view for describing an example in which the adjustment mechanism of the embodiment is assembled.

As shown in FIG. 8A, the resin ring 73 is provided in the fitting concave member 72 to be integrally rotatable with respect to the fitting concave member 72. In addition, the resin ring 73 is bitten by the screw section 61a (specifically, a tip portion) of the fastening bolt 61 to cooperate with rotation of the fastening bolt 61. Accordingly, the resin ring 73 can be rotated in the same direction as an arrow B together with the fastening bolt 61 by rotating the fastening bolt 61, for example, clockwise like the arrow B.

Here, the fitting concave member 72 is movable by rotation of, for example, clockwise in a direction in which the fitting concave member 72 is separated from the fitting convex member 71 (i.e., a direction in which the fitting concave member 72 approaches the support attachment section 51), and the female screw 84 is screwed onto the male screw 79 of the fitting convex member 71. Accordingly, when the fitting concave member 72 is rotated clockwise like the arrow B, the fitting concave member 72 can be expanded (moved) toward the support members 18 like an arrow C. When the fitting concave member 72 is moved like the arrow C, the overhanging bottom section 83 of the fitting concave member 72 abuts the support attachment section 51 of the support member 18.

Figure 8B:
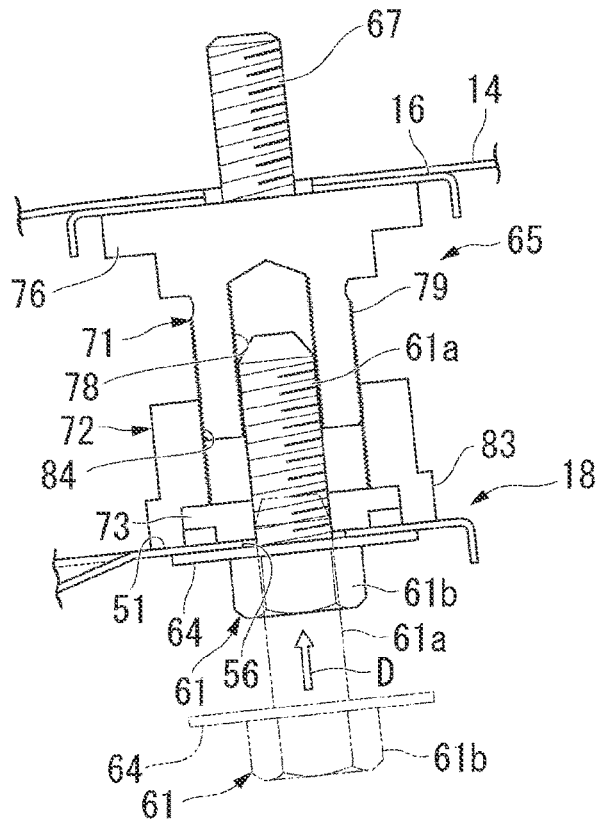
FIG. 8B is a cross-sectional view for describing a state in which the adjustment mechanism of the embodiment is assembled.

As shown in FIG. 8B, when the overhanging bottom section 83 abuts the support attachment section 51, the fitting concave member 72 and the resin ring 73 stop rotating and stand still. When the fastening bolt 61 (shown by an imaginary line) is continuously rotated solely like the arrow B, the area of the resin ring 73 in which the screw section 61a is bitten is deformed (crushed). When the resin ring 73 is crushed, the fastening bolt 61 is moved toward the female screw 78 of the fitting convex member 71 like an arrow D.

When the fastening bolt 61 is moved, the screw section 61a of the fastening bolt 61 is screwed into the female screw 78 of the fitting convex member 71. Accordingly, the head section 61b (shown in a solid line) of the fastening bolt 61 fastens the support attachment section 51 from below. Accordingly, the fitting concave member 72 is fixed to the support attachment section 51, and the adjustment mechanism 65 is reliably assembled.

In other words, the support attachment section 51 is fastened to the fitting concave member 72 by the fastening bolt 61. Accordingly, the adjustment mechanism 65 is assembled, and the roof panel 14 and the support members 18 can be fastened and fixed to the adjustment mechanism 65 by the fastening bolt 61.

In addition, as shown in FIG. 5, the plurality of locking claws 92 are formed on the resin ring 73. Accordingly, the screw section 61a of the fastening bolt 61 and the resin ring 73 can come reliably into contact with each other by the plurality of locking claws 92. Accordingly, the fitting concave member 72 can be reliably rotated clockwise together with the resin ring 73 in cooperation with rotation of the fastening bolt 61. Accordingly, the fitting concave member 72 can be reliably extended (moved) toward the support members 18, and the fitting concave member 72 can be brought into contact with and reliably fixed to the support members 18.

Next, an example in which the adjustment mechanism 65 is assembled to the vehicle body again through maintenance or the like according to the embodiment will be described with reference to FIG. 9A, FIG. 9B, FIG. 10A and FIG. 10B.

Figure 9A:
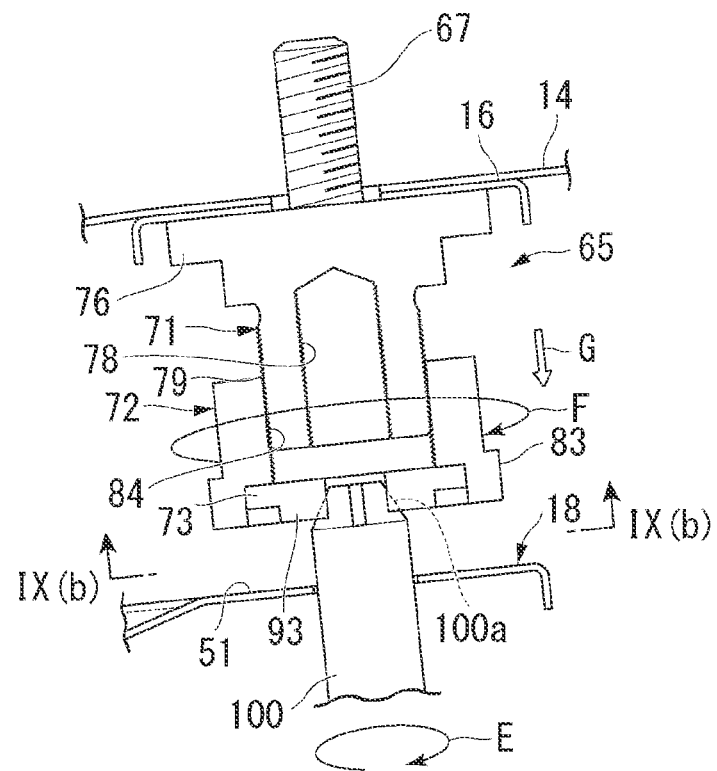
FIG. 9A is a cross-sectional view for describing an example in which the adjustment mechanism of the embodiment is operated by a tool after maintenance.
Figure 9B:
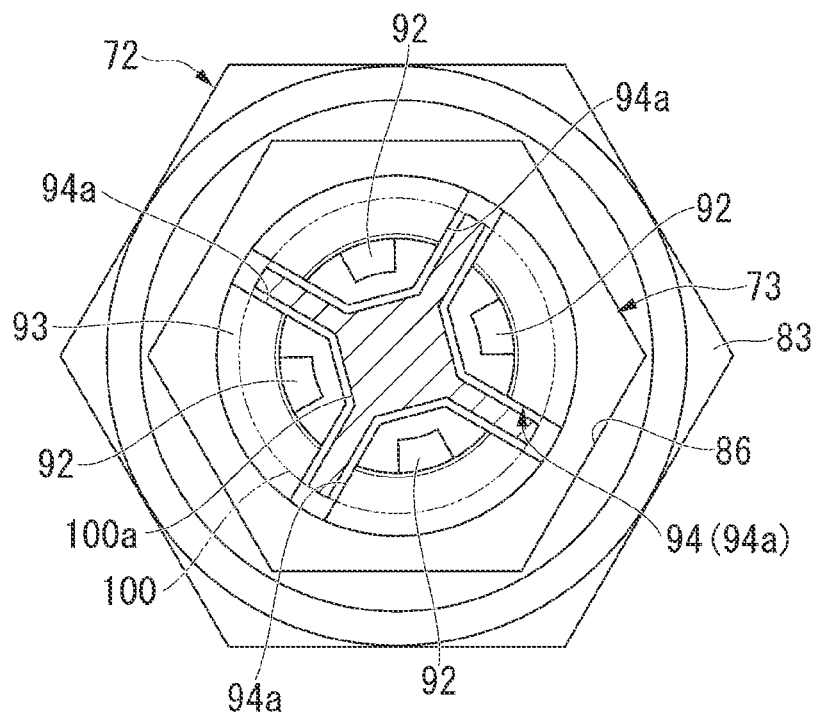
FIG. 9B is a cross-sectional view along line IX-IX in FIG. 9A.

As shown in FIG. 9A and FIG. 9B, in the embodiment, as the fastening bolt temporary holding member, for example, the resin ring 73 formed of a resin is used. In this case, once the fastening bolt 61 is tightened, the plurality of locking claws 92 of the resin ring 73 may be crushed. When the plurality of locking claws 92 are crushed, even if the article fixing device 20 is attached to the vehicle body again through maintenance or the like, it is difficult to rotate the resin ring 73 clockwise in cooperation with the fastening bolt 61.

Here, the tool locking groove 94 is formed in the resin ring 73. The tool 100 is locked to the tool locking groove 94. The tool locking groove 94 is formed in the convex section 93. The convex section 93 protrudes toward the support members 18 further than the plurality of locking claws 92. Accordingly, the tool locking groove 94 can approach the support members 18, and the tool 100 can easily access (engage with) the tool locking groove 94.

Similar to the tool locking groove 94, the tool 100 has a tip portion 100a formed in a cross shape like, for example, a Philipps head screwdriver. Accordingly, the tip portion 100a of the tool 100 can be easily engaged with the tool locking groove 94. In addition, when the tip portion 100a of the tool 100 is formed in a cross shape, in a state in which the tip portion 100a is engaged with the tool locking groove 94, an engaged place (a contact place) with the tool locking groove 94 (i.e., the resin ring 73) can be increased compared to, for example, a slot head screwdriver.

Accordingly, when the resin ring 73 is rotated with the tool 100, the load applied to the tool locking groove 94 can be appropriately distributed. Accordingly, for example, even when the ring formed of a resin is used like the resin ring 73, it is difficult to crush the tool locking groove 94 with the tip portion 100a of the tool 100. Accordingly, strength of the tool locking groove 94 (i.e., the resin ring 73) can be suppressed.

In this way, in a state in which the tip portion 100a of the tool 100 is engaged with the tool locking groove 94, when the tool 100 is rotated clockwise like an arrow E, the resin ring 73 can be rotated in the same direction like an arrow F. Accordingly, the fitting concave member 72 can be rotated clockwise by the resin ring 73 like the arrow F. Accordingly, the fitting concave member 72 can be extended (moved) toward the support members 18 like an arrow G.

Figure 10A:
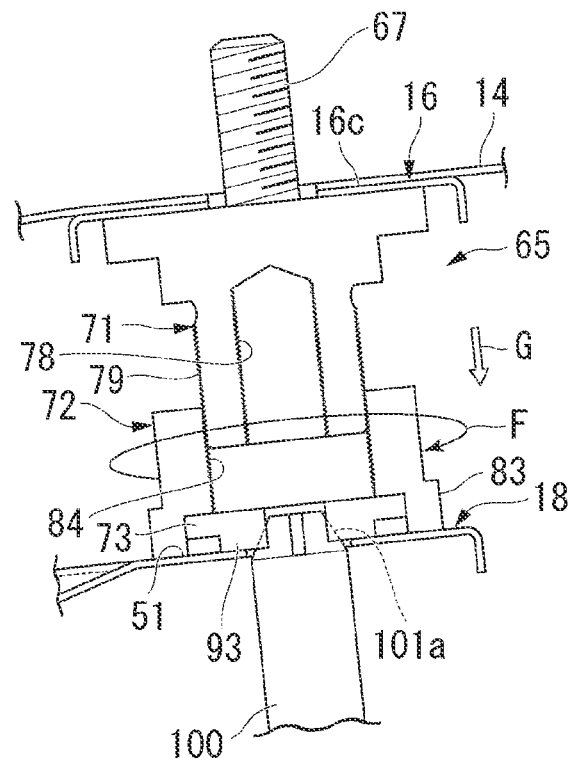
FIG. 10A is a cross-sectional view for describing a state in which the adjustment mechanism of the embodiment is caused to abut a support member by a tool after maintenance.

As shown in FIG. 10A, the overhanging bottom section 83 abuts the support attachment section 51 of the support member 18. That is, in a state in which the overhanging bottom section 83 abuts the support attachment section 51 of the support member 18, the adjustment mechanism 65 is interposed between the roof panel 14 (specifically, the raised sections 16c of the reinforcement member 16) and the support members 18. In this state, the tool 100 is removed from the tool locking groove 94 (see FIG. 9B).

Figure 10B:
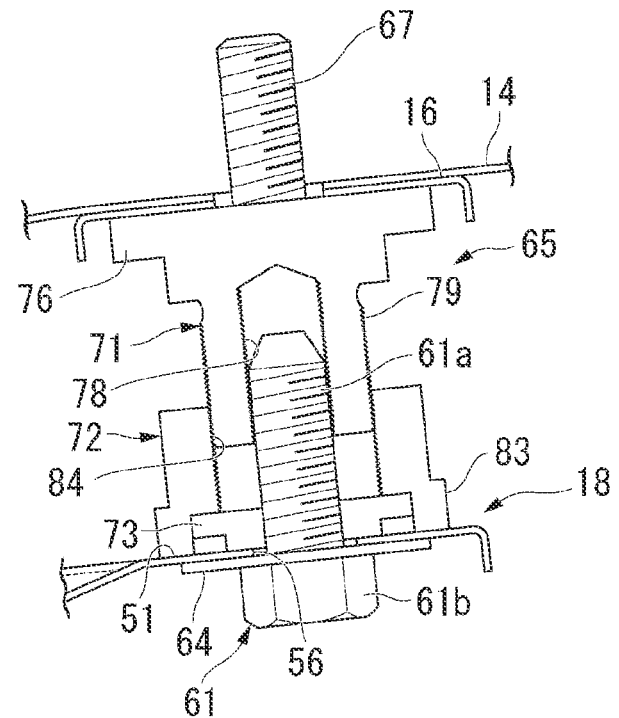
FIG. 10B is a cross-sectional view for describing a state in which the adjustment mechanism of the embodiment is assembled after maintenance.

As shown in FIG. 10B, the fastening bolt 61 is inserted into the attachment hole 56 of the support attachment section 51 from below, the screw section 61a of the fastening bolt 61 is screwed into the female screw 78 of the fitting convex member 71. In this state, the fastening bolt 61 is rotated clockwise.

Here, the plurality of locking claws 92 of the resin ring 73 are crushed. For this reason, when the fastening bolt 61 is rotated clockwise, the resin ring 73 is kept stationary without cooperating with the fastening bolt 61. Accordingly, when the fastening bolt 61 is rotated clockwise, the head section 61b of the fastening bolt 61 fastens the support attachment section 51 from below. Accordingly, the fitting concave member 72 is fixed to the support attachment section 51, and the adjustment mechanism 65 is reliably assembled, for example, after maintenance. In other words, the support attachment section 51 is fastened to the fitting concave member 72 by the fastening bolt 61. Accordingly, for example, after maintenance, the roof panel 14 and the support members 18 are fastened and fixed by the fastening bolt 61 at the adjustment mechanism 65.

Further, the technical scope of the present invention is not limited to the embodiment, and various modifications may be added without departing from the scope of the present invention.

For example, while the example in which the raised sections 16c are joined to the lower surface 14c of the roof panel 14 on the side of the lower surface of the roof panel 14 and the head seating surfaces 66 . . . of the article fixing device 20 are joined to the lower surface 16d of the raised section 16c has been described in the embodiment, there is no limitation thereto. As another example, for example, the head seating surfaces 66 . . . of the article fixing device 20 may be directly joined to the lower surface 14c of the roof panel 14.

In addition, while the roof rail 22 as the article of the article fixing device has been described exemplarily in the embodiment, there is no limitation thereto. As another example, for example, parts attached to the vehicle body such as a spoiler may be used as articles.

Further, while the resin ring 73 is exemplified as the fastening bolt temporary holding member in the embodiment, there is no limitation thereto. As another example, for example, a metal ring may be used as the fastening bolt temporary holding member.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An article fixing device comprising:
an adjustment mechanism interposed between a first plate and a second plate and joined to a side of a lower surface of the first plate;
a protrusion provided integrally with the adjustment mechanism and configured to fix an article to an upper surface of the first plate; and
a fastening bolt configured to fasten the second plate to the adjustment mechanism,
wherein the adjustment mechanism comprises:
a first member provided integrally with the protrusion;
a second member that is able to be screwed to the first member; and
a fastening bolt temporary holding member that is provided on the second member and that cooperates with rotation of the fastening bolt;
wherein the fastening bolt temporary holding member has a tool locking groove to which a tool is able to be locked.

2. The article fixing device according to claim 1, wherein the fastening bolt temporary holding member has a locking claw that locks to the fastening bolt.

3. The article fixing device according to claim 1, wherein the fastening bolt temporary holding member is formed in a polygonal shape when seen in a plan view so as to be fitted into a concave section of the second member.

4. The article fixing device according to claim 1, wherein the fastening bolt temporary holding member has the tool locking groove formed in a convex section protruding toward the second plate further than the locking claw.

5. The article fixing device according to claim 1, wherein the tool locking groove is formed in a cross shape.

\* \* \* \* \*